United States Patent
Son et al.

(10) Patent No.: US 10,334,697 B2
(45) Date of Patent: Jun. 25, 2019

(54) METHOD AND DEVICE FOR DISPLAYING ILLUMINATION

(71) Applicant: Samsung Electronics Co., Ltd., Suwon-si (KR)

(72) Inventors: Minjung Son, Suwon-si (KR); Donghoon Sagong, Suwon-si (KR); KeeChang Lee, Seongnam-si (KR); Hyong Euk Lee, Suwon-si (KR); Heesae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 15/248,183

(22) Filed: Aug. 26, 2016

(65) Prior Publication Data
US 2017/0099715 A1    Apr. 6, 2017

(30) Foreign Application Priority Data

Oct. 5, 2015  (KR) ........................ 10-2015-0139766

(51) Int. Cl.
*G06T 15/00* (2011.01)
*H05B 37/02* (2006.01)
*G06T 15/50* (2011.01)

(52) U.S. Cl.
CPC ......... *H05B 37/0227* (2013.01); *G06T 15/50* (2013.01); *G06T 15/506* (2013.01)

(58) Field of Classification Search
CPC .... G06T 15/50; G06T 15/506; H05B 37/0227
See application file for complete search history.

(56) References Cited

U.S. PATENT DOCUMENTS 8,259,110 B1    9/2012  Carr et al.
2005/0195332 A1*  9/2005  Sakagawa ............... G06T 15/60
                                                       348/578

(Continued)

FOREIGN PATENT DOCUMENTS

JP       9-319894 A    12/1997
JP    2005-310188 A    11/2005

(Continued)

OTHER PUBLICATIONS

Anonymous, "(1) Ai Photometric Light—Arnold for Maya User Guide—Solid Angle," URL:http://web.archive.org/web/20150204051354/https://support.solidangle.com/display/AFMG/Ai+Photometric+Light, Published on Feb. 4, 2015, retrieved on Feb. 6, 2017, pp. 1-2 (2 pages, in English).

(Continued)

*Primary Examiner* — Alexander H Taningco
*Assistant Examiner* — Kurtis R Bahr
(74) *Attorney, Agent, or Firm* — NSIP Law

(57) ABSTRACT

A method of displaying an illumination includes: based on illumination information, determining, using a least one processor, an illumination area to which an illumination assigned in a virtual space is projected; and visualizing, using the at least one processor, an illumination effect produced by the illumination with respect to a determined boundary area in the illumination area, the determined boundary area including a boundary and a portion of the determined illumination area that is less than all of the determined illumination area.

21 Claims, 14 Drawing Sheets

(56) References Cited

U.S. PATENT DOCUMENTS

| | | | | |
|---|---|---|---|---|
| 2007/0083499 | A1* | 4/2007 | Lee | G06F 16/9038 |
| 2007/0236485 | A1* | 10/2007 | Trepte | G06T 15/60 |
| | | | | 345/207 |
| 2008/0231631 | A1* | 9/2008 | Matsumura | G06T 15/60 |
| | | | | 345/419 |
| 2009/0128552 | A1* | 5/2009 | Fujiki | G06T 19/006 |
| | | | | 345/419 |
| 2011/0002508 | A1* | 1/2011 | Basso | G06T 15/50 |
| | | | | 382/103 |
| 2011/0234631 | A1* | 9/2011 | Kim | G06T 15/60 |
| | | | | 345/632 |
| 2011/0260654 | A1* | 10/2011 | Tanigawa | H05B 37/0227 |
| | | | | 315/313 |
| 2012/0229460 | A1* | 9/2012 | Fortin | G06T 1/20 |
| | | | | 345/419 |
| 2013/0141434 | A1* | 6/2013 | Sugden | G02B 27/017 |
| | | | | 345/426 |
| 2013/0328873 | A1* | 12/2013 | Harada | G06T 15/405 |
| | | | | 345/422 |
| 2014/0333766 | A1* | 11/2014 | Enohara | H05B 37/029 |
| | | | | 348/143 |
| 2016/0105645 | A1* | 4/2016 | Yamazaki | H04N 7/181 |
| | | | | 348/159 |
| 2016/0205749 | A1* | 7/2016 | Creusen | H05B 37/0218 |
| | | | | 315/151 |

FOREIGN PATENT DOCUMENTS

| | | |
|---|---|---|
| KR | 10-2005-0051677 A | 6/2005 |
| KR | 10-0653946 B1 | 2/2007 |

OTHER PUBLICATIONS

Extended European Search Report dated Mar. 2, 2017, in counterpart European Application No. 16188376.4 (7 pages, in English).

* cited by examiner

METHOD AND DEVICE FOR DISPLAYING ILLUMINATION

CROSS-REFERENCE TO RELATED APPLICATIONS

This application claims the benefit under 35 USC 119(a) of Korean Patent Application No. 10-2015-0139766, filed on Oct. 5, 2015 in the Korean Intellectual Property Office, the entire disclosure of which is incorporated herein by reference for all purposes.

BACKGROUND

1. Field

The following description relates to a device and method for displaying an illumination.

2. Description of Related Art

As a result of development in mobile graphic processing unit (GPU) technology, a content provider may provide virtual environment content by utilizing three-dimensional (3D) graphics technology of a mobile device.

In addition, the 3D graphics technology of the mobile device may generate a virtual object to maximize realism and immersion in an augmented reality (AR) and a virtual reality (VR), thereby providing a user with the virtual object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure relates to a device and method for displaying an illumination. For example, the illumination may be a visual representation, in a vurtual space, of light projected from a light source. For example, the device and method may be applicable to displaying an illumination in 3D graphics technology, and, more particularly, to displaying an illumination in augmented reality (AR) and virtual reality (VR) applications. The device and method may enable an illumination effect to be visualized and displayed with minimum overhead. In one general aspect, a method of displaying an illumination includes: based on illumination information, determining, using a least one processor, an illumination area to which an illumination assigned in a virtual space is projected; and visualizing, using the at least one processor, an illumination effect produced by the illumination with respect to a determined boundary area in the illumination area, the determined boundary area including a boundary and a portion of the determined illumination area that is less than all of the determined illumination area.

The determining of the illumination area may include: based on the illumination information, determining, as the illumination area, a space between coordinates of an origin of the illumination and coordinates of nodes that define a base surface of the illumination.

The determining of the illumination area may include: based on the illumination information, determining, as the illumination area, an area between two nodes that define a base line of the illumination area and coordinates of an origin of the illumination on a layer corresponding to a viewpoint with respect to the virtual space.

The determining of the illumination area may include: determining the illumination area based on at least one of a position, a threshold angle, a direction, an intensity, or a color included in the illumination information.

The visualizing may include increasing a brightness of a pixel in the boundary area compared to a brightness of a pixel outside the boundary area in the illumination area.

The visualizing may include determining incremental levels of brightness for pixels in the boundary area, based on respective distances between the pixels and an origin of the illumination, and respective distances between the pixels and the boundary.

The visualizing may include fitting, to the illumination area, a brightness adjustment map to define incremental levels of brightness for pixels in the boundary area in a predetermined form.

The visualizing may include extending the boundary area in response to an overlap between the boundary area and another boundary area of another illumination.

The visualizing may include: in response to an overlap between the boundary area and another boundary area of another illumination, visualizing a brightness and a color of the boundary area by overlapping a brightness and a color of the another boundary area in an overlapping area of the boundary area and the another boundary area.

The visualizing may include: in response to an overlap between the boundary area and another boundary area of another illumination, assigning a weight to respective incremented levels of brightness for pixels in an overlapping area of the boundary area and the another boundary area.

A non-transitory computer readable medium may include programmed instructions configured to control a processor to perform the method of displaying the light source.

In another general aspect, a device for displaying an illumination includes: a processor configured to determine, based on illumination information, an illumination area to which an illumination assigned in a virtual space is projected, and define a boundary area comprising a boundary and a portion of the determined illumination area that is less than all of the illumination area; and a display configured to display an illumination effect produced by the illumination with respect to the boundary area.

The processor may be further configured to determine, as the illumination area, a space between coordinates of an origin of the illumination and coordinates of nodes that define a base surface of the illumination, based on the illumination information.

The processor may be further configured to determine, as the illumination area, an area between two nodes that define a base line of the illumination and coordinates of an origin of the illumination on a layer corresponding to a viewpoint with respect to the virtual space, based on the illumination information.

The processor may be further configured to increase a brightness of a pixel in the boundary area compared to a brightness of a pixel outside the boundary area in the illumination area.

The processor may be further configured to determine incremental levels of brightness for pixels in the boundary area based on respective distances between the pixels and an origin of the illumination, and respective distances between the pixels and the boundary.

The processor may be further configured to fit, to the illumination area, a brightness adjustment map to define incremental levels of brightness for pixels in the boundary area in a predetermined form.

The processor may be further configured to extend the boundary area in response to an overlap between the boundary area and another boundary area of another illumination.

The processor may be further configured to control the display to display a brightness and a color of the boundary area by overlapping a brightness and a color of another boundary area of another illumination in an overlapping area of the boundary and the another boundary area, in response to an overlap between the boundary area and the another boundary area.

The processor may be further configured to assign a weight to respective incremented levels of brightness for pixels in an overlapping area of the boundary area and another boundary area of another illumination, in response to an overlap between the boundary area and the another boundary area.

In another general aspect, a method of displaying an illumination includes: determining, using a processor, a first illumination area corresponding to light projected by a first light source, a second illumination area corresponding to light projected by a second light source, a first boundary area of the first light source, wherein the first boundary area includes a first boundary and a portion of the first illumination area that is less than all of the first illumination area, a second boundary area of the second light source, wherein the second boundary area includes a second boundary and a portion of the second illumination area that is less than all of the second illumination area, and an extended boundary area based on an overlap area in which the first boundary area and the second boundary area overlap; and visualizing, using the processor, an illumination effect produced by the first and second light sources with respect to the first boundary area, the second boundary area and the extended boundary area.

The visualizing may include: increasing brightness for a pixel in the first boundary area compared to a brightness adjustment for a pixel in a remainder of the first illumination area; and increasing brightness for a pixel in the second boundary area compared to a brightness adjustment for a pixel in remainder of the second illumination area.

The visualizing may further include adding, in the overlap area, a brightness adjustment for a pixel in the first boundary area and a brightness adjustment for a pixel the second boundary area.

The visualizing may include overlapping, in the overlap area, a color of the first boundary area and a color of the second boundary area.

Other features and aspects will be apparent from the following detailed description, the drawings, and the claims.

Figure 1:
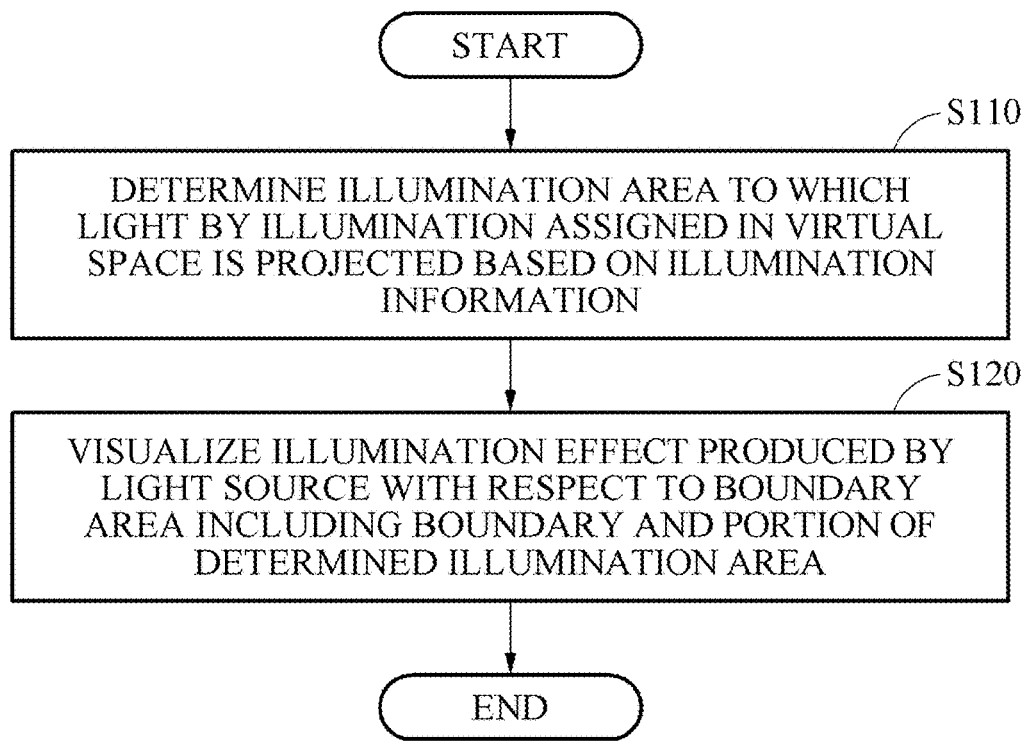
FIG. 1 is a flowchart illustrating an example of a method of displaying an illumination.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing examples with reference to the accompanying drawings, like reference numerals refer to like constituent elements and a repeated description related thereto will be omitted. When it is determined detailed descriptions related to a related known function or configuration may make the purpose of the examples unnecessarily ambiguous, such detailed descriptions will be omitted here.

FIG. 1 is a flowchart illustrating an example of a method of displaying an illumination.

Referring to FIG. 1, in operation S110, a processor of a device for displaying an illumination determines an illumination area to which a light or illumination produced by a light source assigned in a virtual space is projected based on illumination information. Although the illumination or light source assigned and used in the virtual space is described as a spotlight, the light source assigned in the virtual space is not limited thereto.

The illumination information may include information on a position, a threshold angle, a direction, an intensity, and a color of the illumination in the virtual space. The position of the light source may be referenced using two-dimensional (2D) coordinates or three-dimensional (3D) coordinates of the light source in the virtual space. The direction of the illumination may denote a progress direction of a light projected from the light source, such as from a spotlight. The threshold angle may denote an angle defining a range in which the light projected from the spotlight is represented in the virtual space. The intensity may denote an intensity of the light projected from the light source. The color may denote a color of the illumination.

The illumination area may be referred to as a 2D area or a 3D area in which the light produced by the light source is projected in the virtual space. In an example, the processor determines the illumination area based on at least one of the position, the threshold angle, the direction, the intensity, or the color of the illumination included in the illumination information. For example, the processor may determine the illumination area based on the position of the light source by limiting an area to which a light is projected by the light source in the direction of the illumination to the threshold angle. Detailed descriptions of how the illumination area may be determined will be provided with reference to FIGS. 3, 5, and 6.

In operation S120, the processor controls a display to visualize an illumination effect by the illumination with respect to a boundary area including a boundary and a portion of the determined illumination area. The boundary area may be referred to as an area in which the illumination effect produced by the illumination is visualized in the virtual space. The boundary of the illumination area may be an outline excluding a base line or a base surface of the illumination area, and the boundary of the illumination area may be determined based on the position, the direction, and the threshold angle of the illumination.

The illumination effect denotes a visual representation of the light projected from the light source. Detailed descriptions of the illumination effect will be provided with reference to FIGS. 7 through 10.

A method of displaying an illumination may represent a spotlight by minimally covering a background and a target object in a virtual space, so that the method of displaying the illumination can be applied to an application in which a predetermined target object is desired to be highlighted.

For example, the method of displaying the illumination may minimally cover an object by centrally representing a boundary portion of a path of a light projected by a light source, and represent an effect of blurring overlapping areas of illumination so that an overlapping portion of paths of lights produced by different light sources are realistically represented. The processor that performs the method of FIG. 1 may visualize a path of the spotlight in real time by minimally covering or applying illumination to the object, and the visualized path may represent a background without changing or obscuring the background since a sense of incompatibility is reduced even when the background is relatively bright by minimizing such obscuring or illumination application to portions of the illumination path, as only examples.

Figure 2:
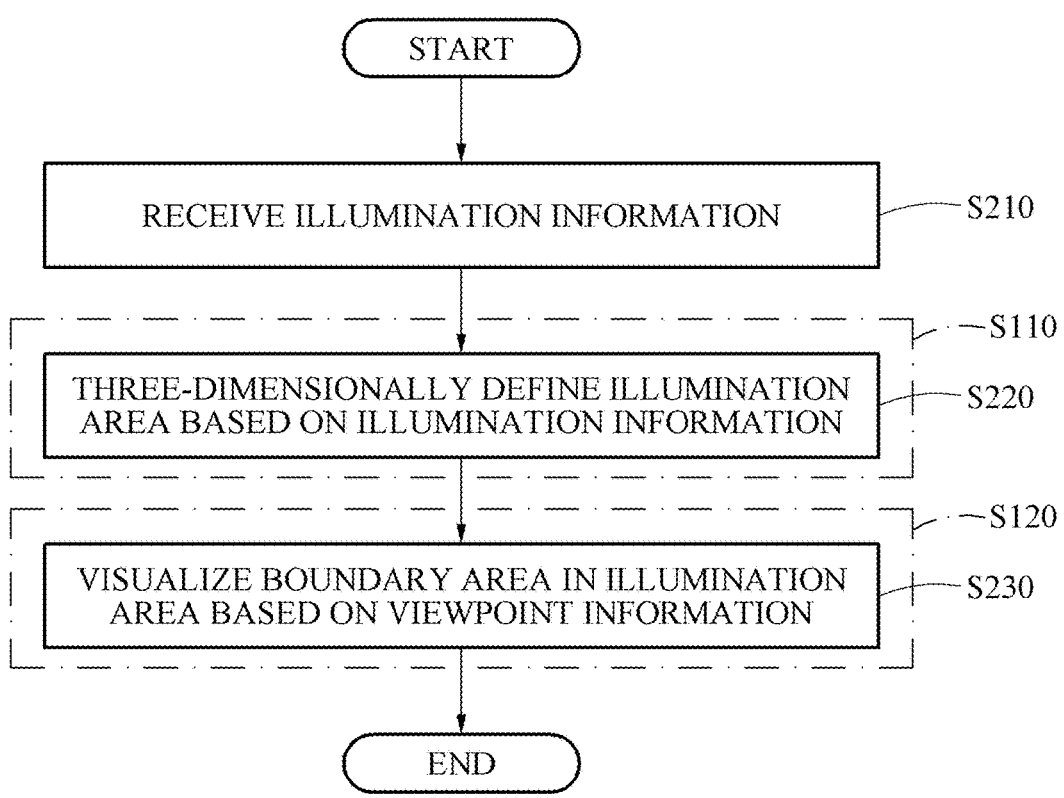
FIG. 2 is a flowchart illustrating another example of a method of displaying an illumination.

FIG. 2 is a flowchart illustrating another example of a method of displaying an illumination.

Referring to FIG. 2, in operation S210, the processor receives the illumination information. In an example, the processor receives an input of the illumination information from the user through an input receiver. In another example, the processor receives the illumination information from an outside source through wired and wireless communication by a communicator. However, the illumination information is not limited to the aforementioned examples, and may be preset by the processor.

In operation S220, the processor three-dimensionally defines the illumination area based on the illumination information. For example, the processor determines, as the illumination area, a space between coordinates of the illumination and coordinates of nodes to define a base surface by the light projected from the light source based on the illumination information in the virtual space. The three-dimensionally defined illumination area will be described with reference to FIG. 3.

In operation S230, the processor visualizes a boundary area in the illumination area based on viewpoint information. For example, the processor may project the three-dimensionally defined illumination area to a layer corresponding to a viewpoint based on the viewpoint information on a viewpoint represented on the display at the device for displaying the illumination, and determine a portion and a boundary of the projected illumination area as a boundary area. The boundary area will be described with reference to FIG. 3. Examples of methods of visualizing the boundary area will be described with reference to FIGS. 7 through 11.

The viewpoint information may be information associated with a viewpoint of a predetermined scene. The processor projects the boundary area and the illumination area to the layer corresponding to the viewpoint. The processor may define an increment level of a brightness required in each pixel in the boundary area projected to the corresponding layer, overlay the layer with a scene corresponding to the viewpoint, and increase a brightness of each pixel to represent a scene by the defined increment level.

Figure 3:
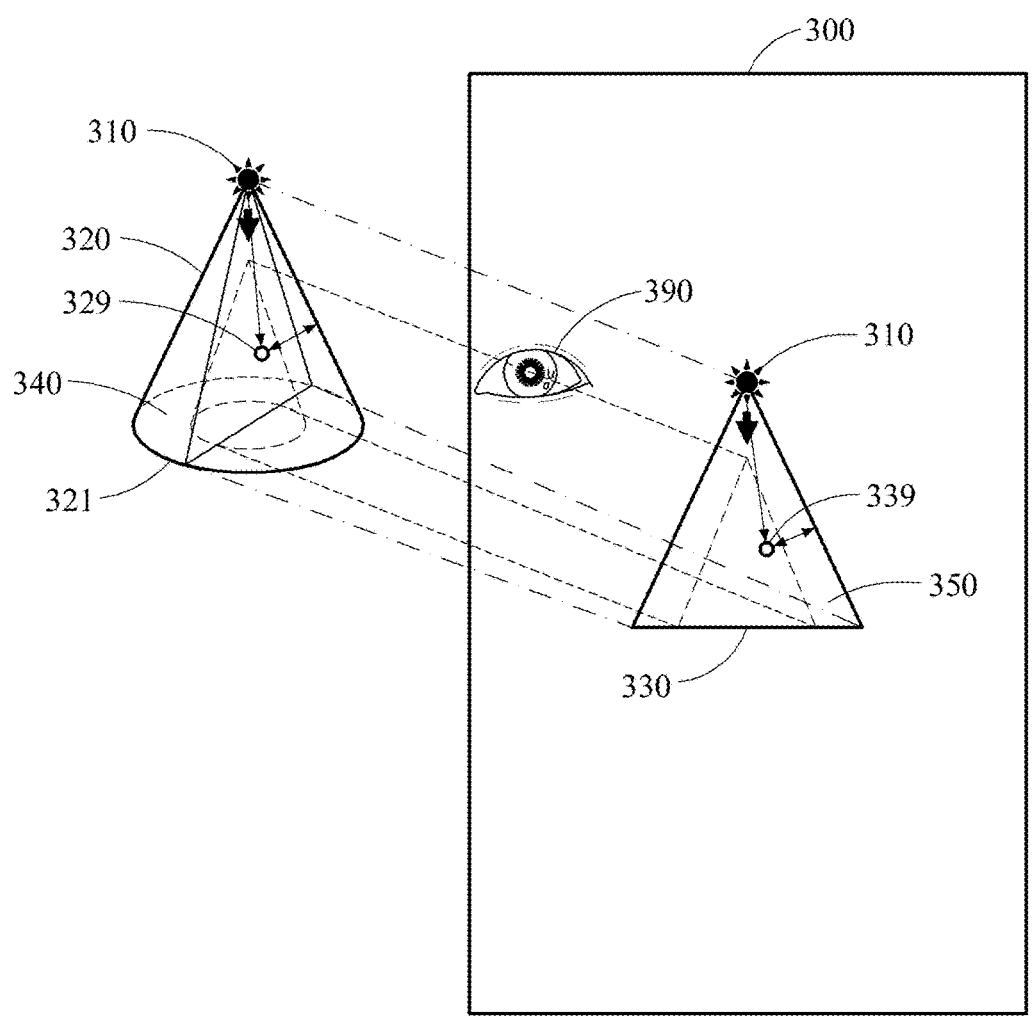
FIG. 3 illustrates an example of a process of determining an illumination area.

FIG. 3 illustrates an example of a process of determining an illumination area, according to an embodiment.

As illustrated in FIG. 3, a processor of a device for displaying the illumination, for example, may determine an illumination area 320 produced by a light source 310 in a virtual space as described in operation 220 of FIG. 2. For example, the processor may determine the illumination area 320 based on coordinates, a direction, and a threshold angle of the light source 310 in the virtual space. The processor may calculate coordinates of nodes 321 to define a base surface by a light projected from the light source 310 based on the coordinates, the direction, and the threshold angle of the light source 310. The base surface may be referred to as a bottom or destination at which the light projected from the light source 310 reaches. For example, the processor may define the illumination area 320 in a form of a circular cone, so that an illumination effect may be visualized with a minimum overhead in a mobile environment. The processor may visualize the illumination effect at high speed by simplifying the illumination area 320 in the form of the circular cone. In this example, the processor defines an illumination area using illumination light source and a number of nodes to define a base surface having a circular form in a form of a circular cone.

To visualize a boundary area 340 in operation 230 of FIG. 2, the processor may determine the boundary area 340 including a portion of the illumination area 320 and a boundary of the illumination area 320. The boundary area 340 includes an area corresponding to an outline of the illumination area 320. The processor may determine an incrementing level of a brightness in a pixel in the boundary area 340 based on a distance between this pixel and the light source 310 and a distance between the pixel 329 and the boundary. The incrementing level of the brightness of the pixel 329 indicates a level of which the brightness increases in a pixel representing a scene, in response to a layer 300 corresponding to a viewpoint overlaid on the scene.

In an example, in response to the pixel 329 being relatively close to the boundary of the illumination area 320 and the light source 310, the processor may determine an incremented level of the brightness for that pixel to have a value relatively close to a maximum brightness set based on an intensity of the illumination 310. In another example, the processor may determine the incremented level of the brightness of a pixel that is in the boundary area 340 but relatively distant from the boundary of the illumination area 320 and the light source 310 to have a decreased value in comparison to the incremented level of brightness of a pixel that is relatively close to the boundary of the illumination area 320 and the light source 310. Thus, the boundary of the illumination area 320 by the light source 310 may be represented with a maximum brightness, and a pixel that is relatively distant from the boundary of the illumination area 320 and the illumination 310 may be represented with minimized brightness change, or as relatively dark with respect to illumination from the light source 310. A scattering effect of a light is inversely represented, so that the processor may minimize a cover of an object by a visualization of a path of the light and a user may recognize the illumination area 320 as the path of the light. Thus, the user may recognize a corresponding boundary area as the path of the light due to a similarity in a style of which a brightness gradually changes.

In this example, the processor projects the boundary area 340 to the layer 300 corresponding to a viewpoint to visualize the boundary area 340. A viewpoint 390 may denote a point from which a scene represented on a display of a device is observed. The layer 300 corresponding to the viewpoint 390 may denote a layer to which the illumination area 320 is projected in the virtual space to be seen at the predetermined viewpoint 390. The processor visualizes the illumination effect with respect to the boundary area 340 by overlaying the layer 300 on the scene to be seen at the viewpoint 390.

In an example, as illustrated in FIG. 3, the processor determines an illumination area 330 projected to the layer 300 corresponding to the viewpoint 390 and a boundary area 350 projected to the layer 300 based on viewpoint information. For example, as described above, the processor determines the incremented level of the brightness in the projected boundary area 350 by projecting, to the layer 300, the increment level of the brightness determined based on the distance between the example pixel 329 and the light source 310 and the distance between the example pixel 329 and the boundary in the boundary area 340. However, the processor may make additional determinations. For example, the processor may determine the incremented level of the brightness in a pixel 339 on the layer 300 based on a position with respect to the boundary, a position of the light source 310, and the position of the pixel 339 on the layer 300 with respect to the pixel 339 in the boundary area 350 projected to the layer 300 corresponding to the viewpoint 390.

According to one or more embodiments, the processor overlays, on a scene corresponding to the viewpoint 390, the layer 300 indicating the incremental levels of the brightness in pixels in the projected boundary area 350. For example, the processor may visualize the illumination effect in the boundary area 340 by increasing a brightness of the pixel 329 corresponding to a scene by the corresponding incremented level of the brightness by the pixel 339 of the layer 300 overlaid on the scene. The processor may change colors of pixels of a scene to which the boundary area 340 is overlaid by reflecting a color of the light source 310 in response to the light source 310 having the color.

In an example, in response to the illumination area 320 being defined as a circular cone, the processor may calculate a distance from a predetermined pixel to an illumination, a distance from the pixel to a boundary, and a brightness value in the pixel to determine the extent that the illumination from the light source 310 is represented in the scene.

Figure 4:
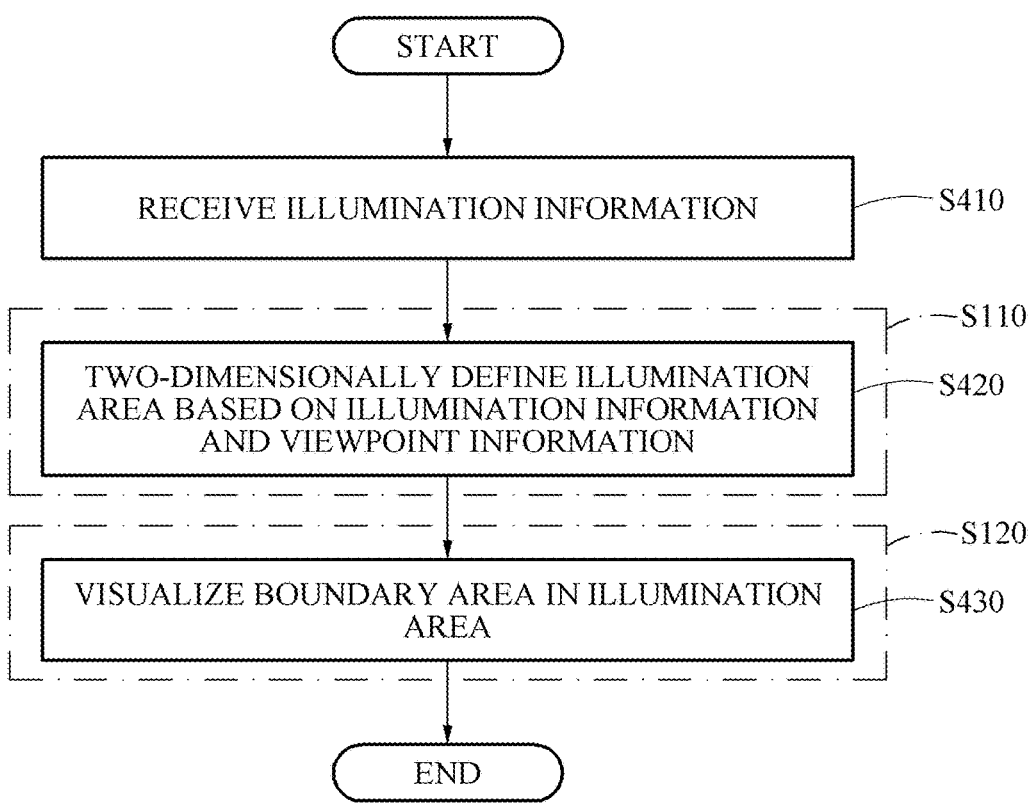
FIG. 4 is a flowchart illustrating yet another example of a method of displaying an illumination.

FIG. 4 is a flowchart illustrating an example of still another example of a method of displaying an illumination.

In operation S410, the processor receives illumination information. The processor may receive the illumination information in a way similar to that of operation S210 illustrated in FIG. 2.

In operation S420, the processor two-dimensionally defines an illumination area based on illumination information and viewpoint information. For example, differently from the process illustrated in FIG. 2, the processor may define the illumination area as a 2D area on a layer corresponding to a viewpoint. Based on the illumination area, the processor may determine, as the illumination area, an area between two nodes to define a base line of the 2D area by a light projected from the light source, and may determine coordinates of the light source on a layer corresponding to the viewpoint with respect to a virtual space. In an example, based on the viewpoint information and the illumination information, the processor may use a predefined function to calculate coordinates of two nodes to define the base line by the light projected from the light source, and to define the coordinates of the light source. The two-dimensionally defined illumination area is described in more detail with reference to FIGS. 5 and 6.

In operation S430, the processor visualizes a boundary area in the illumination area. For example, the processor may determine, as the boundary area, an area including a portion of the illumination area and a boundary of the defined illumination area. Detailed descriptions of the boundary area are provided below with reference to FIGS. 5 and 6. Example visualizations of the boundary area are described below with reference to FIGS. 7 through 11.

Figure 5:
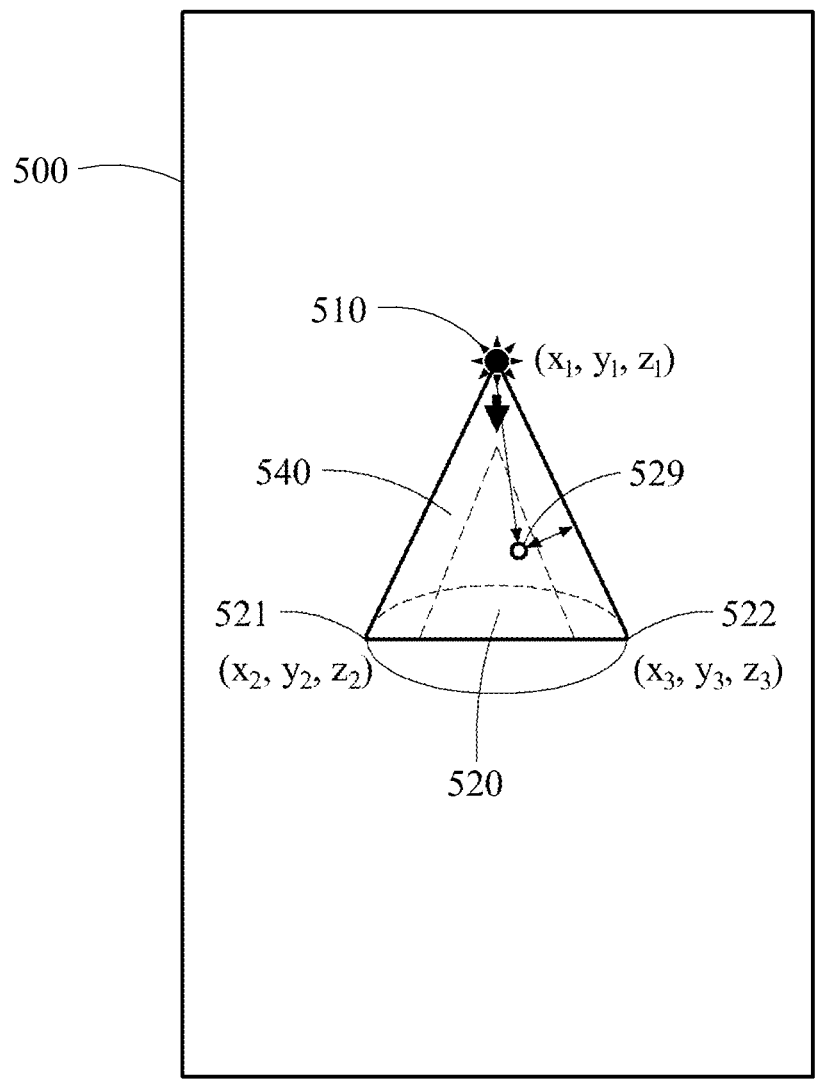
FIGS. 5 and 6 illustrate other examples of processes of determining an illumination area.
Figure 6:
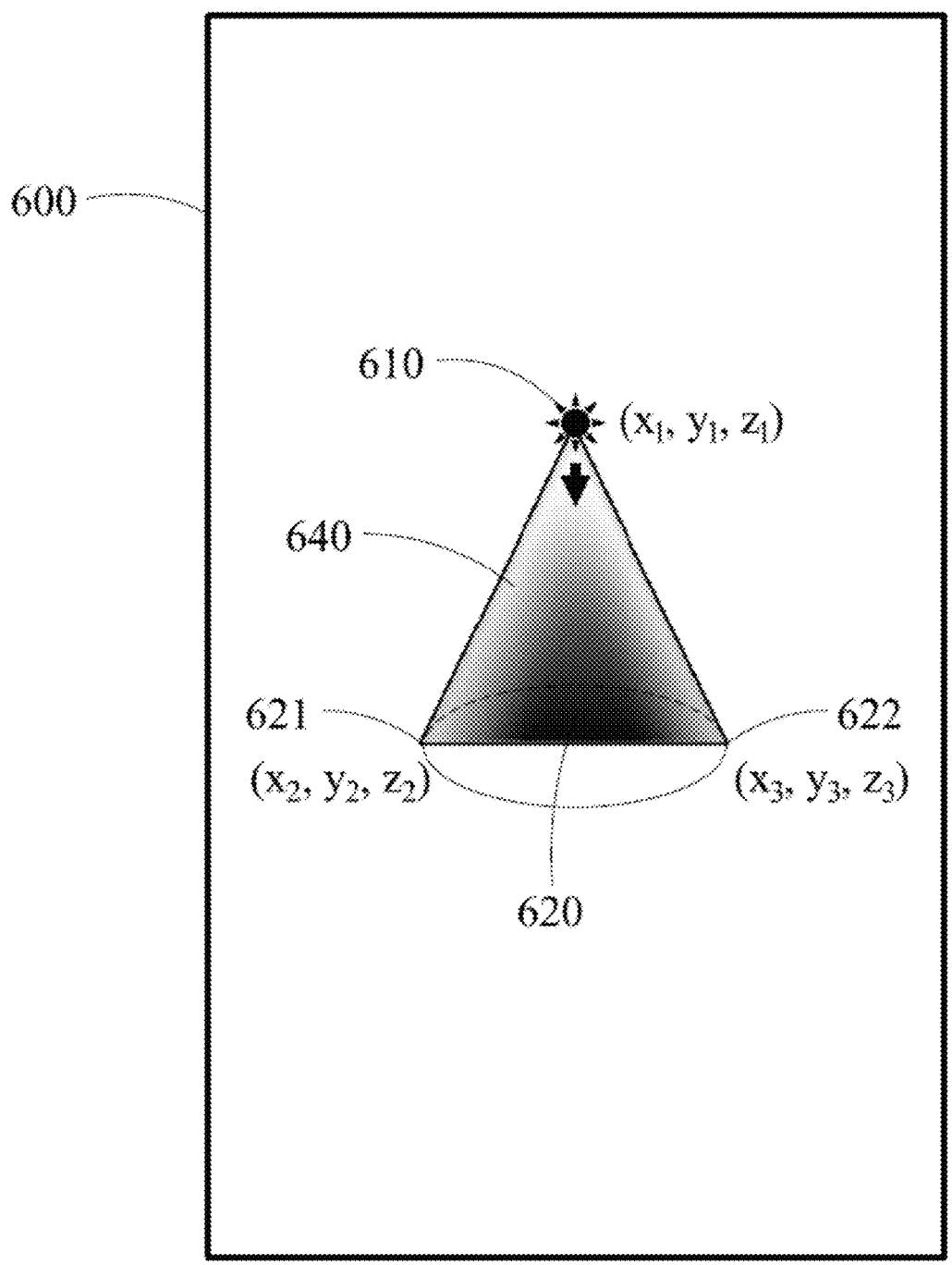

FIGS. 5 and 6 illustrate other examples of a process of determining an illumination area.

FIG. 5 illustrates an example of an illumination area 520 and a boundary area 540 represented on a layer 500 corresponding to a viewpoint. The processor may determine the illumination area 520 produced by illumination light source 510 in a virtual space, as described above in operation S420 of FIG. 4. In an example, the processor may calculate coordinates, for example, $(x_1, y_1, z_1)$ illustrated in FIG. 5, of the illumination 510 on the layer 500 corresponding to the viewpoint based on illumination information and viewpoint information. The processor may further calculate coordinates, for example, $(x_2, y_2, z_2)$ and $(x_3, y_3, z_3)$ illustrated in FIG. 5, of each of nodes 521 and 522 to define a base line by a light projected from the light source 510 on the layer 500 corresponding to the viewpoint, based on the illumination information and the viewpoint information. The base line may be referred to as a bottom of the layer 500 corresponding to the viewpoint, and the light projected from the light source 510 reaches the bottom. The processor may determine, as the illumination area 520, an area between a position of the light source 510 and positions of the two nodes 521 and 522 to define the base line. For example, the processor may determine the illumination area 520 in a form of a triangle based on 3D coordinates of nodes or vertices of the triangle, so that an illumination effect may be visualized with a minimum computational or memory overhead in a mobile environment. The processor may visualize the illumination effect at high speed by simplifying the calculating of the illumination area 520 in the form of the triangle. In this example, to define an illumination area, the processor may manage three nodes including two nodes to define a base surface and a node corresponding to an illumination.

As described in operation S430 of FIG. 4, the processor may determine the boundary area 540 including a portion of the illumination area 520 and a boundary of the illumination area 520 to visualize the boundary area 540. The boundary area 540 includes an area corresponding to an outline or contour of the illumination area 520. The processor may determine an incremented level of a brightness for a pixel in the boundary area 540 based on a distance between the pixel and the light source 510 and a distance between the pixel and the boundary. For example, the processor may determine the incremented level of the brightness in this pixel to be inversely proportional to the distance between the pixel and the light source 510, and the distance between the pixel and the boundary of the illumination area 520. The processor may determine the incremented level of the brightness for respective pixels to be a relatively large values in response to the pixels being relatively close to the light source 510 and/or the boundary of the illumination area 520. As examples, the processor may determine the incremented level of the brightness of the example pixel 529 to be a relatively small value or zero in response to the pixel 529 being relatively distant from the light source 510 and the boundary of the illumination area 520, such as shown in FIG. 5.

To visualize the boundary area 540, the processor may overlay, to a scene corresponding to the viewpoint, the layer 500 corresponding to the viewpoint and including the boundary area 540 in which incremented levels of the brightness have been determined for pixels of the boundary area 540 and optionally additional pixels in other areas of the illumination area 520 beyond the boundary area 540. For example, the processor may visualize an illumination effect in the boundary area 540 by increasing a brightness of pixels corresponding to the scene by the incremented levels of brightness for the pixels of the layer 500 overlaid to the scene. The processor may change a color of a pixel of a scene corresponding to the boundary area 540 by reflecting a color of the light source 510. The effects of the color of the light source 510 may also be incrementally represented.

In an example, the processor may calculate a distance from a predetermined pixel to an illumination, a distance from the pixel to a boundary, and a brightness value in the pixel in response to the illumination area 520 being defined as a triangle.

FIG. 6 illustrates an example of an illumination area 620 and a boundary area 640 represented on a layer 600 corresponding to a viewpoint. In an example, a memory of a device for displaying an illumination may store a brightness adjustment map to define incremented levels of brightness of pixels in the boundary area 640 in a predetermined form. For example, a form of the brightness adjustment map may be identical to a form of the boundary area 640 and may be a triangular form with respect to an light source 610 of a spotlight type. For example, the brightness adjustment map may define an incremented level having a relatively small value in response to a pixel being relatively distant from the light source 610 and a boundary of the illumination area. The brightness adjustment map may define the incremented level of the brightness with respect to pixels of the boundary area 640, while maintaining a preset or existing brightness with respect to remaining areas, e.g., without incremented brightness. For example, the processor may visualize an illumination effect with a minimum overhead using the brightness adjustment map defined in a form of a triangle. In this example, the processor may manage three nodes including two nodes corresponding to a base line and a node corresponding to an illumination. The processor may visualize the illumination effect at high speed based on the brightness adjustment map having a simplified form.

To visualize the boundary area 640 as described above in operation 430 of FIG. 4, the processor may fit, to the illumination area 620, e.g., defined by the nodes of the triangle, the brightness adjustment map to define the incremented levels of brightness in pixels in the boundary area 640 in a predetermined form. For example, based on the illumination information, the processor may match a node corresponding to the light source 610 in the brightness adjustment map to a position of the illumination on the layer 600 corresponding to the viewpoint. The processor may match two nodes corresponding to a base line of the brightness adjustment map to coordinates of the nodes 621 and 622 corresponding to a base line of the illumination area 620, respectively. Thus, the brightness adjustment map may be stretched, reduced, or otherwise changed based on a size and a form of the illumination area 620.

In an example, the memory may pre-store the brightness adjustment map to define the incremented levels of brightness for the pixels in the boundary area 640, so that the device for displaying the illumination may not calculate the increment level of the brightness based on a pixel, an illumination, and a distance between boundaries. Thus, an amount of operations performed by the processor may be reduced when rendering the scene, according to one or more embodiments. In response to the reduced amount of operations, an amount of time and power required for displaying the illumination may be reduced in the device for displaying the illumination.

Since the memory stores the brightness adjustment map in advance instead of calculating distance between a pixel and the illumination and between the pixel and a boundary, the processor may perform a low-overhead loading operation of the brightness adjustment map, thereby largely reducing the amount of operations to be performed on each pixel.

FIGS. 7 through 11 illustrate examples of visualizing a boundary area.

Figure 7:
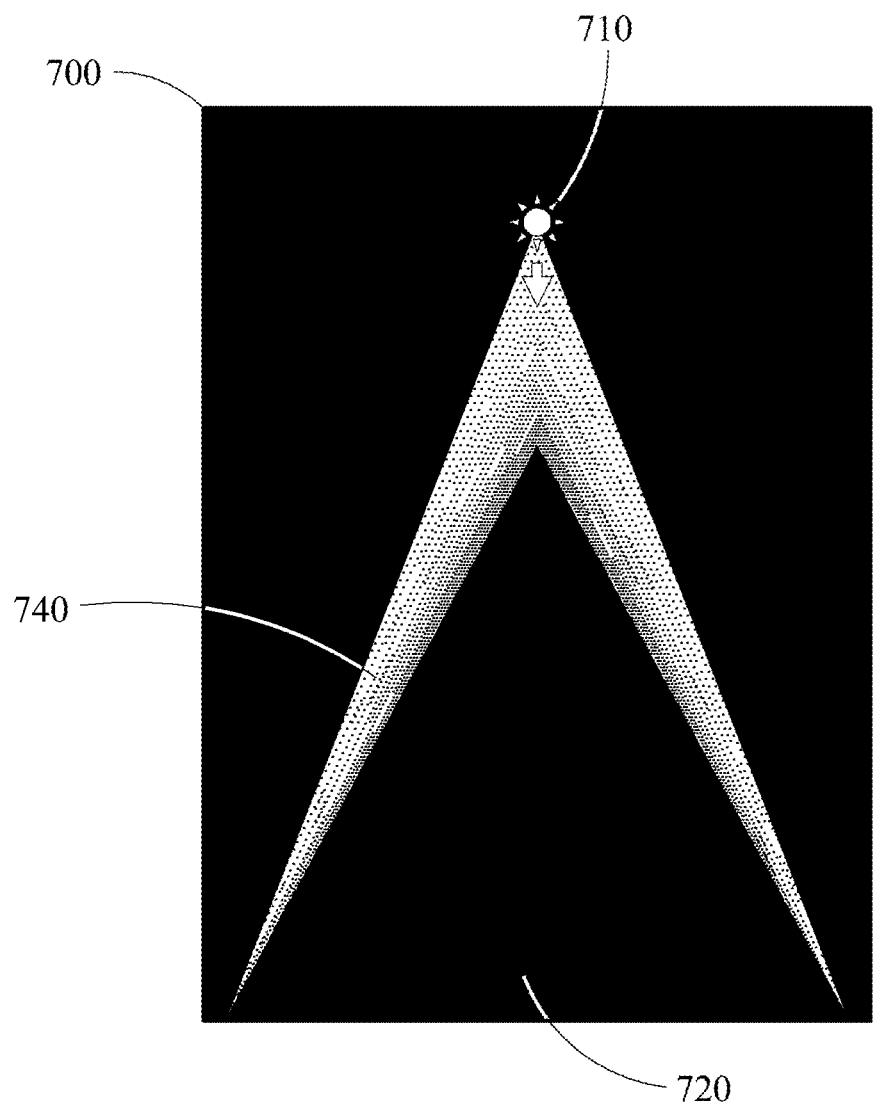
FIGS. 7 through 11 illustrate examples of visualizing a boundary area.

FIG. 7 illustrates visualization of a boundary area 740 in a case in which a single light source 710 is provided in a virtual space. The processor may determine an illumination area and the boundary area 740, which includes a boundary of an illumination area 720 and a portion of the illumination area 720, such as discussed above with regard to in FIGS. 1 through 6. Although FIG. 7 only illustrates the light source 710 in the virtual space for ease of description, FIG. 7 is merely a non-limiting example. For example, a background and an object may exist in the virtual space, in addition to the illumination represented as originating from the light source 710.

The processor may visualize, through a display 700, an illumination effect with respect to a scene based on a viewpoint in response to incremented levels of brightness for pixels in the boundary area 740. For example, the processor may increase (with respect to a remainder of the illumination area 720) the brightness of the pixel in the boundary area 740 of the scene corresponding to the viewpoint in response to the corresponding incremented level of brightness of that pixel defined in the boundary area 740. As illustrated in FIG. 7, the processor may visualize the illumination effect so that the changed or adjusted brightness of a pixel that is relatively distant from the light source 710 and the boundary in the boundary area 740 is relatively low or zero.

Figure 8:
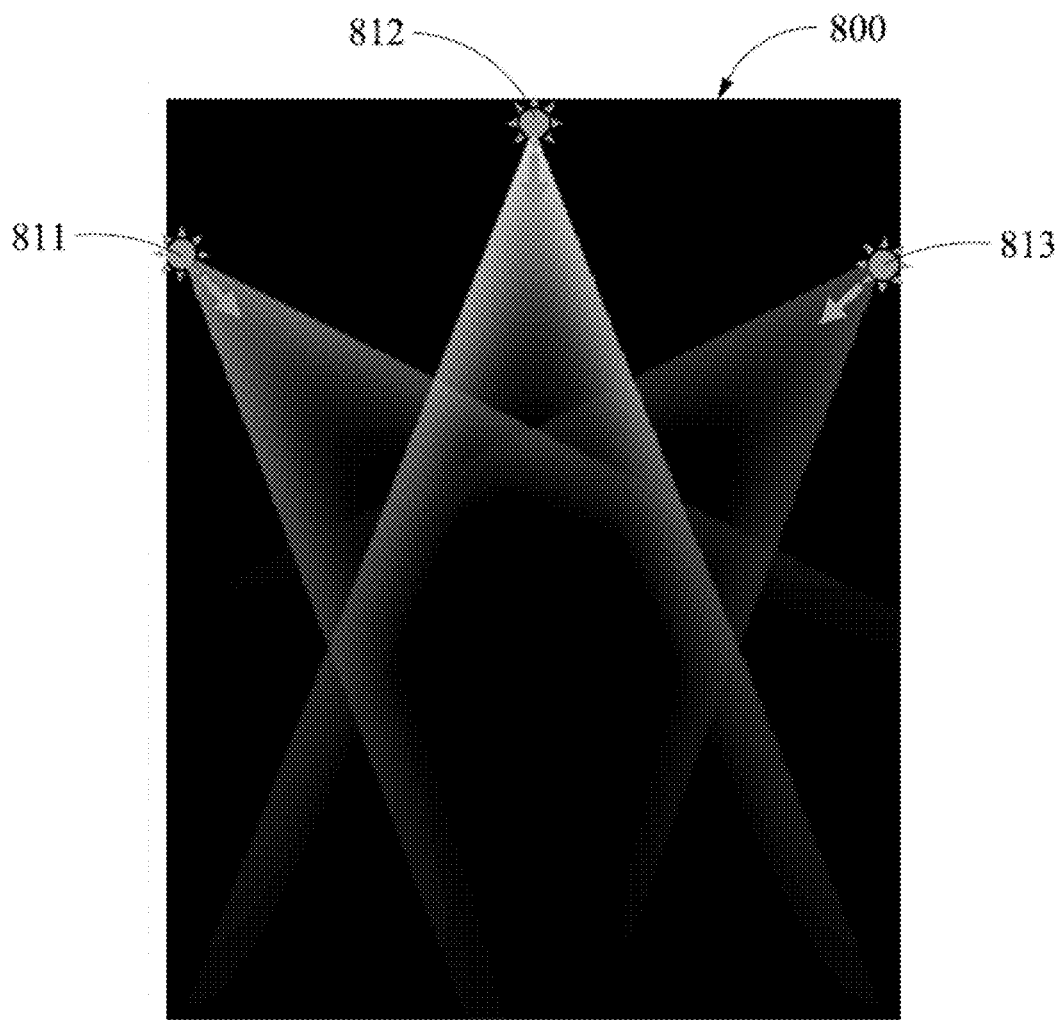

FIG. 8 illustrates an example in which three light sources 811, 812 and 813 exist at a left, center and right side, respectively, in a virtual space. For ease of description, the light source 811, the light source 812 and the light source 813 are referred to hereinafter as a first light source, a second light source and a third light source, respectively.

In an example, the processor may visualize, on a display 800, a brightness and a color of a first boundary area by overlapping a brightness and a color of a second boundary area in a corresponding overlapping area in response to an overlap between the first boundary area of the illumination, e.g., produced by the light source, and the second boundary area of the illumination, e.g., produced by the second light source.

As illustrated in FIG. 8, respective boundary areas in which illumination effects by each light source 811-813 are visualized may overlap, and the processor may additionally reflect a brightness increment produced by another light source in addition to a brightness increment produced by a corresponding light source in an overlapping area. For example, in an area in which the first boundary area of the first light source 811 overlaps the second boundary area of the second light source 812, the processor may increase the brightness of a pixel corresponding to boundary areas in a scene corresponding to a viewpoint by adding an incremental level of brightness produced by the first light source 811 and an incremental level of brightness produced by the second light source 812 with respect to pixels in the overlapping area.

The processor may additionally reflect a color change caused by another illumination produced by another light source, e.g., the third light source in addition to a color change caused by the corresponding illumination. For example, in response to the illumination produced by light source 811 being set as red and the illumination produced by the second light source 812 being set as green, the processor may also display a yellow color in the area in which the illumination produced by the first light source 811 overlaps the illumination produced by the second light source 812.

Figure 9:
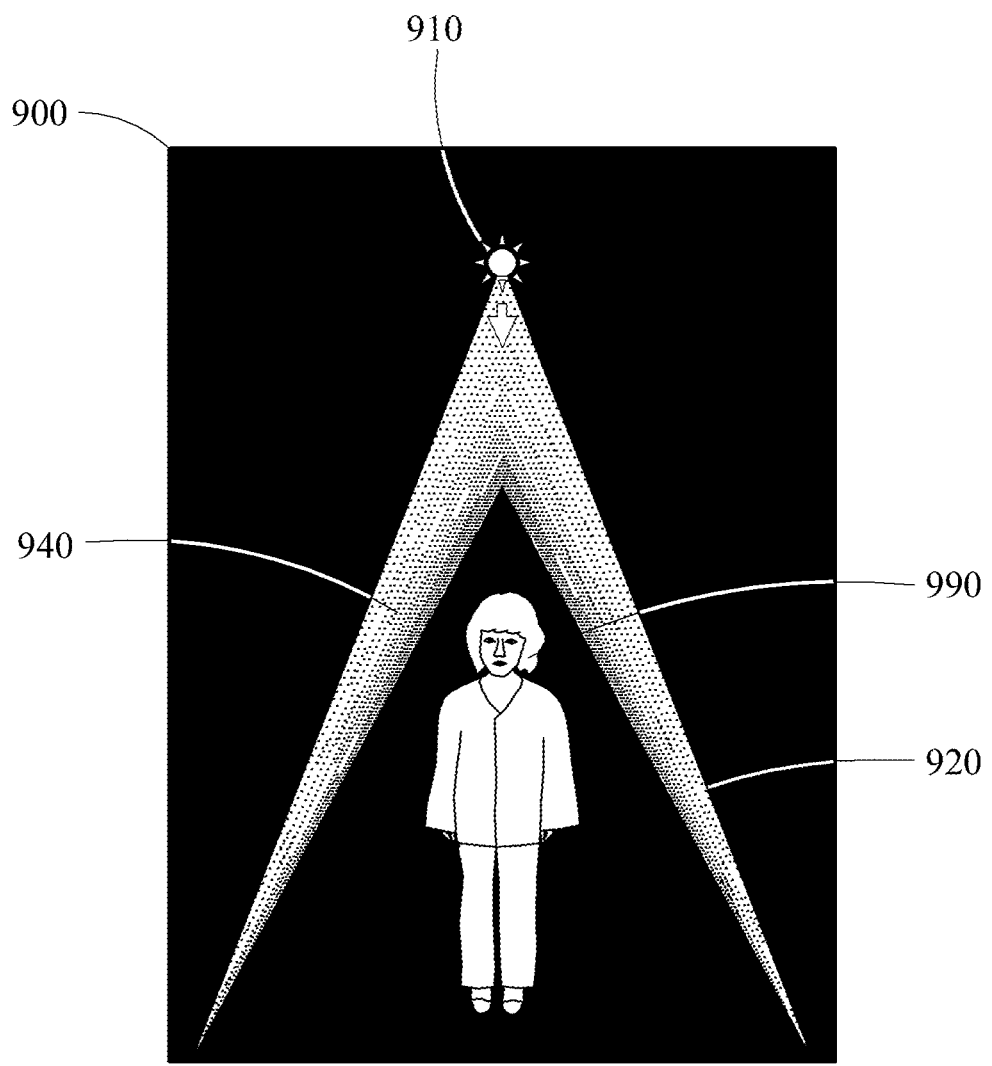

FIG. 9 illustrates an example in which an object 990 is disposed in an illumination area 920 produced by illumination light source 910 in a virtual space.

A boundary area 940 illustrated in FIG. 9 is a partial area of the illumination area 920 including a boundary of the illumination area 920. For example, the processor may determine the boundary area 940 based on a position, a direction, and a threshold angle of the light source 910 as described above.

As illustrated in FIG. 9, even when the object 990 is positioned in the illumination area 920, an illumination effect may be visualized through the boundary area 940. Thus, a device for displaying an illumination may specifically visualize the illumination effect in lieu of interrupting representation of the object 990 on a display 900, e.g., without adjusting a brightness of pixels of the object 550.

In an example, the device for displaying the illumination may specifically visualize a background, an object, and a path of a light produced by a light source in lieu of interrupting a highlighting effect to be applied to the object. The device for displaying the illumination may be, or be included in, a mobile device, for example, a smartphone or a tablet, and may visualize a path of a spotlight, without a complex physical operation, using a central processing unit (CPU), a graphic processing unit (GPU), and standard graphics software included in the mobile device.

Figure 10:
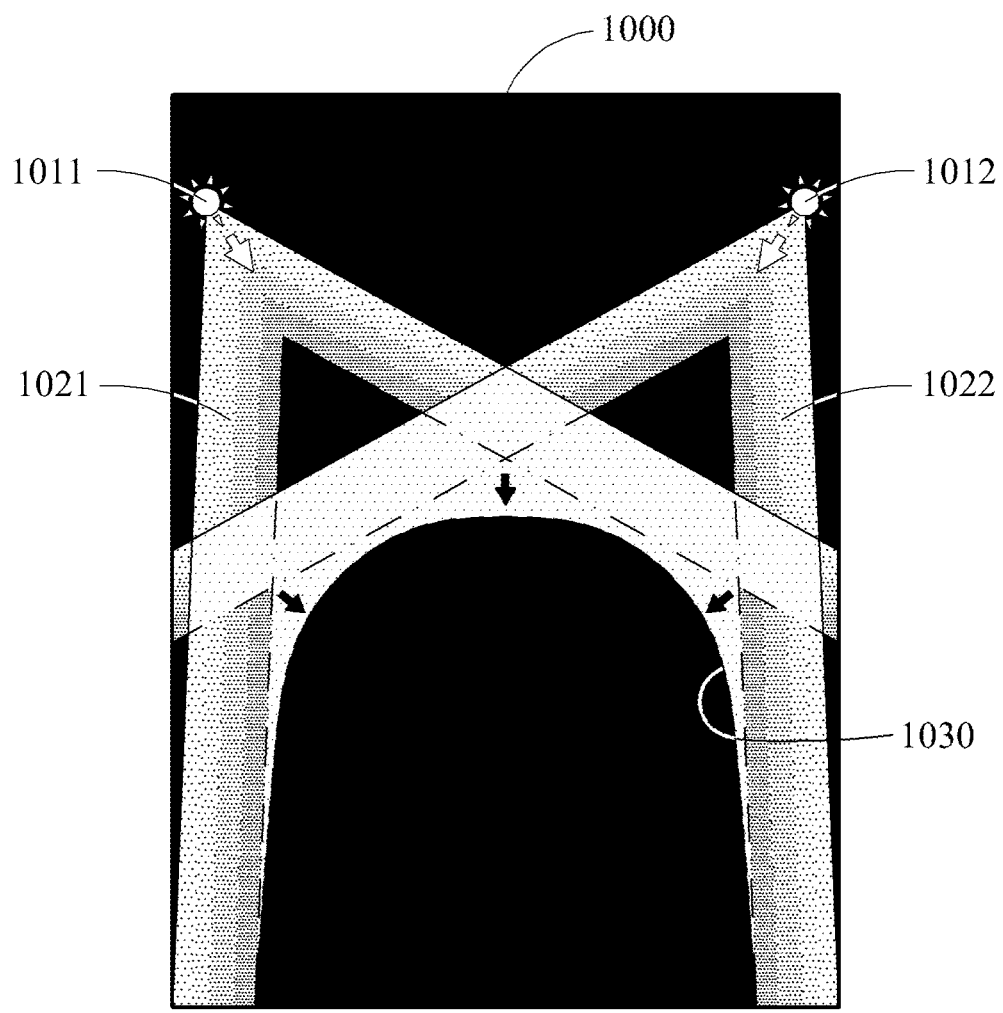

FIG. 10 illustrates an example in which an extended boundary area is formed in response to two light sources 1011 and 1012 arranged at a right side and a left side, respectively, of a virtual space. For ease of description, in a display 1000, the light source 1011 at the left side is referred to hereinafter as a first light source, and the light source 1012 at the right side is referred to hereinafter as a second light source. A boundary area of the first light source 1011 is referred to hereinafter as a first boundary area 1021, and a boundary area of the second light source 1012 is referred to hereinafter as a second boundary area 1022.

The processor may generate an extended boundary area in response to an overlap between the first boundary area and the second boundary area. For example, as illustrated in FIG. 10, the processor may extend the first boundary area 1021 and the second boundary area 1022 based on overlapping areas therebetween. More specifically, the processor may determine a range of an extended boundary area 1030 based on intensity of the first light source 1011 and the second light source 1012, a length of a boundary of each of the first light source 1011 and the second light source 1012, and distances from the first light source 1011 and the second light source 1012. For example, the processor may determine the range of the extended boundary area 1030 to be relatively wide in response to the intensity of the illuminations produced by the first light source 1011 and the second light source 1012 being high. In another example, the processor may determine the range of the extended boundary area 1030 to be relatively wide in response to a close relative distance, for example, a distance between a boundary of a first illumination area (produced by the first illumination 1011) and a boundary of a second illumination area (produced by the second illumination 1012), between boundaries of each illumination area (produced by the respective illuminations 1011 and 1012). Even when a predetermined pixel does not correspond to a boundary area in the first illumination area, the predetermined pixel may correspond to an extended boundary area due to the overlap between the first illumination area and the second illumination area.

The processor may assign a weight to the incremental levels of brightness for pixels in an overlapping area in response to an overlap between the first boundary area and the second boundary area. For example, the processor may add an incremented level of the first boundary area 1021 to an incremented level of the second boundary area 1022 with respect to a pixel in an overlapping area, and assign a weight to the incremental level of the brightness resulting from the addition, in response to an overlap between the first boundary area 1021 of the first light source 1011 and the second boundary area 1022 of the second light source 1012. In an example, the processor may assign a weight to an increment level of a brightness in a boundary area of a light source, such that the overlapping areas may be represented to be brighter.

In an example, a blurring effect of a light may be applied to assigning a weight with respect to a brightness in the extended boundary area 1030 and the overlapping areas, so that a user may easily recognize each path of light even when paths of lights by each illumination overlap.

Figure 11:
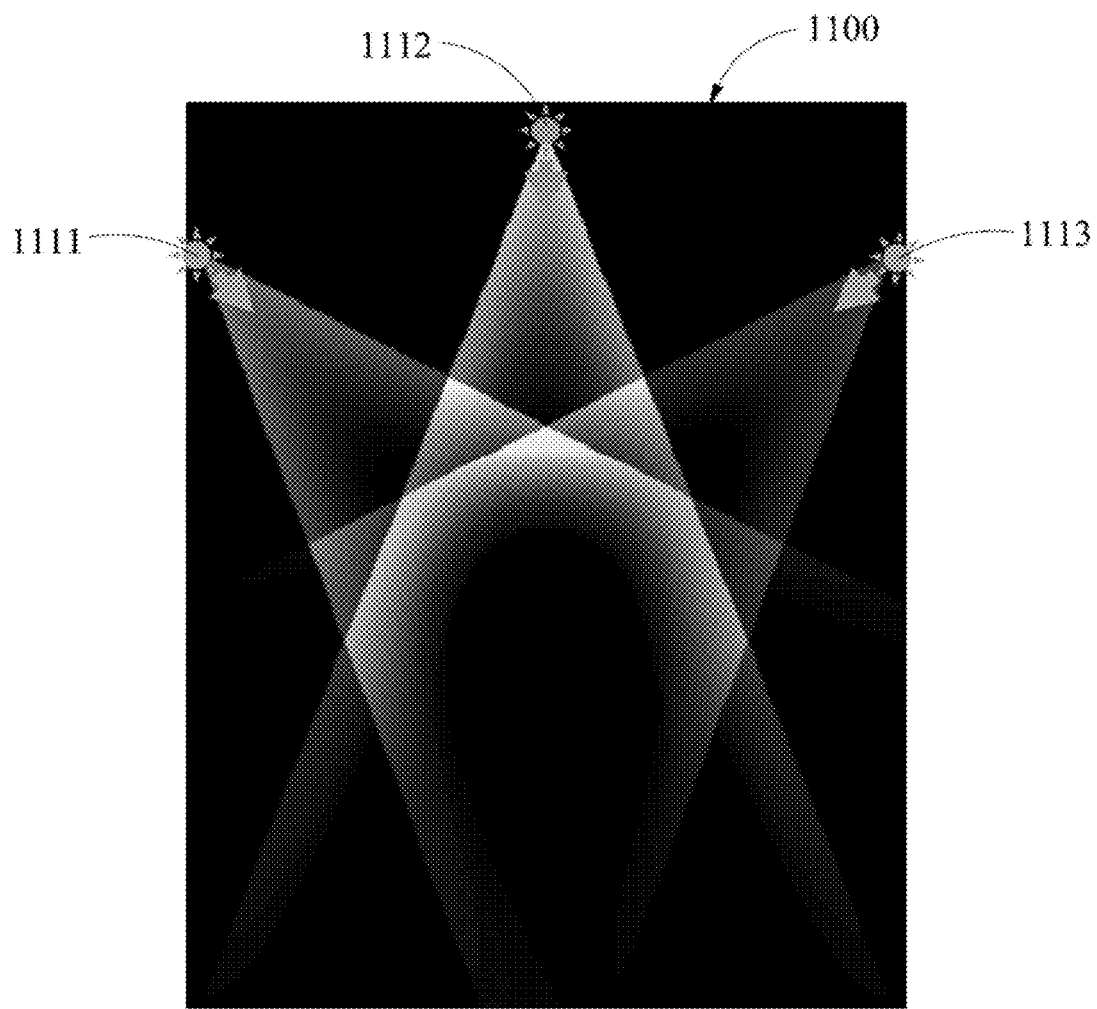

FIG. 11 illustrates an example in which an extended boundary area is formed in based on three light sources arranged in a virtual space. For ease of description, in a display 1100, a light source 1111 at a left side is referred to hereinafter as a first light source, an illumination 1112 at a center is referred to hereinafter as a second light source, and an illumination 1113 at a right side is referred to hereinafter as a third light source.

The processor may form an extended boundary area in response to an overlap between a boundary area of the first light source 1111, a boundary area of the second light source 1112, and a boundary area of the third light source 1113. Based on a similar method as illustrated in FIG. 10, the processor may extend the boundary areas of the first light source 1111, the second light source 1112 and the third light source 1113. Since boundary areas overlap due to the first light source 1111, the second light source 1112, and the third light source 1113 in FIG. 11, the processor may determine the extended boundary area resulting from the overlap to be relatively wide or determine an increment level of a brightness in a pixel in the boundary area to be relatively high, in comparison to the extended boundary area of FIG. 10. A color of the first light source 1111, a color of the second light source 1112, and a color of the third light source 1113 may be combined and visualized in an area in which boundary areas of each of the first light source 1111, the second illumination 1112, and the third illumination 1113 overlap. The foregoing is a representation in which a blurring effect and an adding effect of a brightness are mutually applied in response to an overlap of lights, and a user may recognize an overlapping illumination area as a path of a light.

FIGS. 12 through 15 are block diagrams illustrating examples of a device for displaying an illumination.

Figure 12:
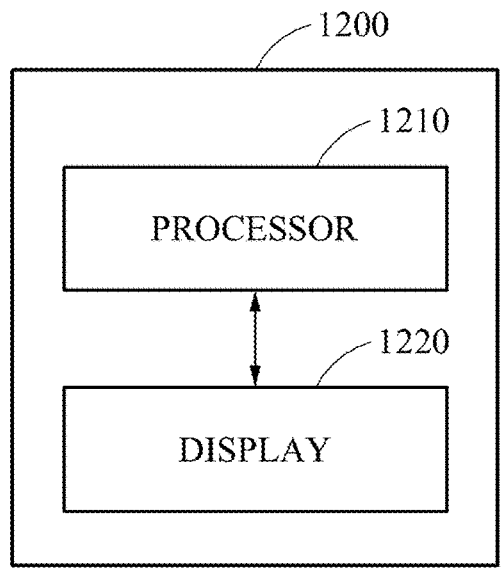
FIGS. 12 through 15 are block diagrams illustrating examples of a device for displaying an illumination.

As illustrated in FIG. 12, a device 1200 for displaying an illumination includes a processor 1210 and an image display apparatus (or "display") 1220. For example, the device 1200 for displaying the illumination may be a smartphone or a tablet personal computer (PC).

The processor 1210 determines, based on illumination information, an illumination area to which a light produced by illumination light source assigned in a virtual space is projected, and defines a boundary area including a boundary and a portion of the determined illumination area. The processor 1210 controls the display 1220 to visualize an illumination effect with respect to the boundary area. According to one or more embodiments, the processor 1210 may determine the illumination area and the boundary area by implementing any, or any combination, of the methods of FIGS. 1 through 11.

The display 1220 visualizes the illumination effect by the illumination with respect to the boundary area. The display 1220 may represent a scene corresponding to a predetermined viewpoint based on viewpoint information. For example, the display 1220 may represent a background and an object arranged in the virtual space as a scene at the predetermined viewpoint.

Figure 13:
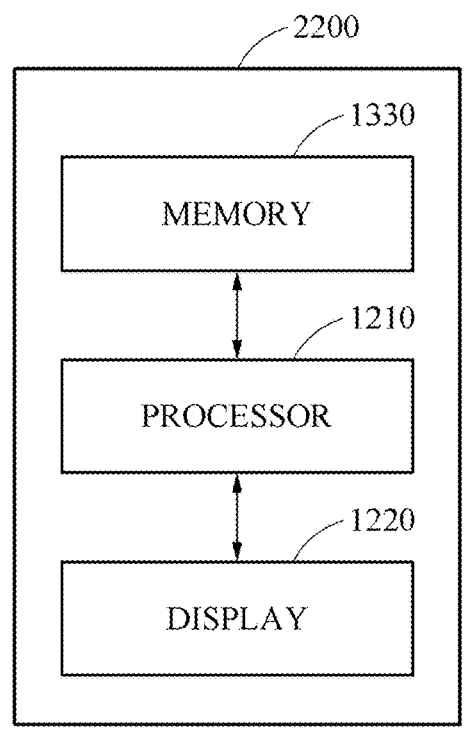

As illustrated in FIG. 13, a device 2200 for displaying an illumination is similar to the device 1200 of FIG. 12, but further includes a memory 1330. The memory 1330 stores a brightness adjustment map to define an increment level of a brightness in a pixel in a boundary area in a predetermined form. The memory 1330, or another non-transitory medium, stores a program including a command for controlling one or more processing devices to execute any, or any combination, of the methods of displaying the illumination illustrated in FIGS. 1 through 11, for example. The memory 1330 temporarily or semi-permanently stores data required for executing the method of displaying the illumination, for example, illumination information and information associated with an illumination area, a boundary area, and an increment level of a brightness.

Figure 14:
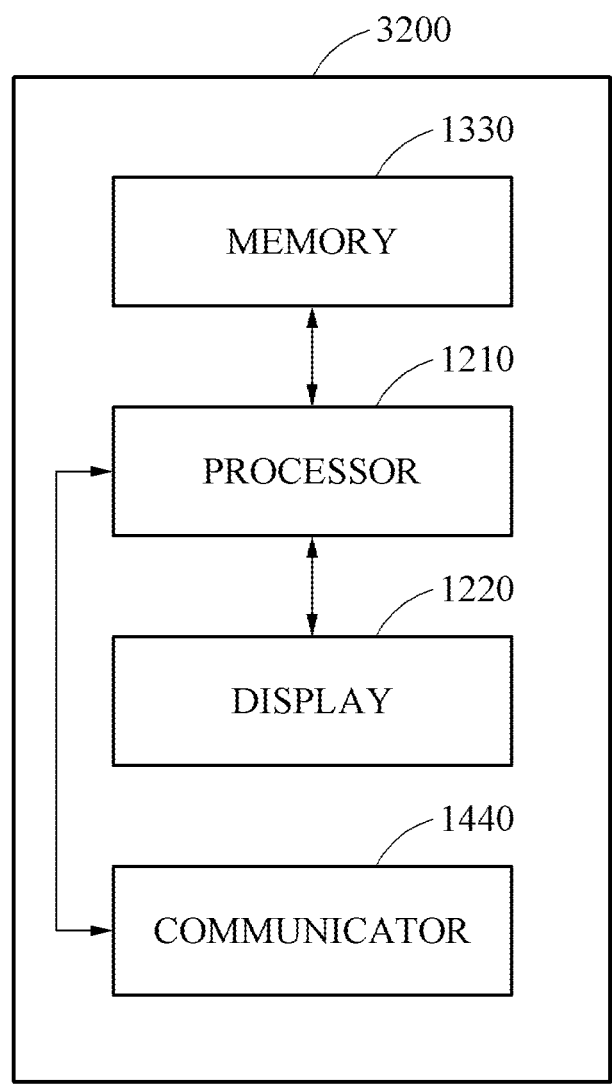

As illustrated in FIG. 14, a device 3200 for displaying an illumination is similar to the device 2200 of FIG. 13, but further includes a communicator 1440. The communicator 1440, via a wired connection or wirelessly, receives data required for executing the method of displaying the illumination, such as any, or any combination, of the methods of FIGS. 1-11. For example, the communicator 1440 receives the illumination information to define an illumination in a virtual space from an external source.

Figure 15:
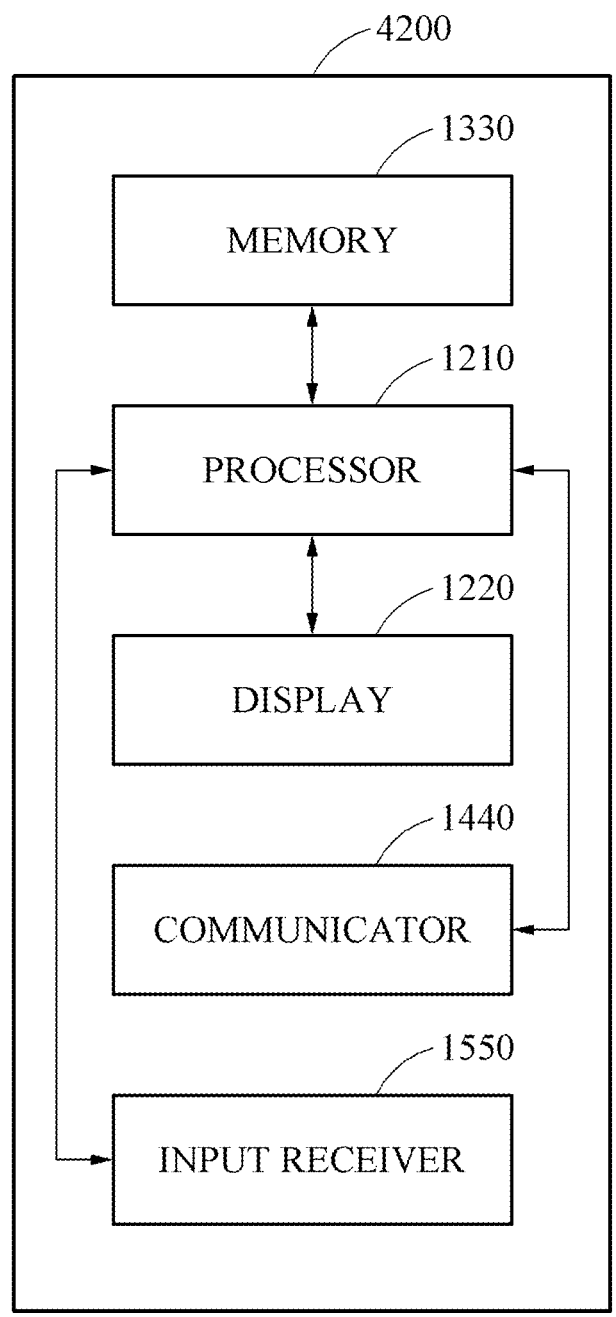

As illustrated in FIG. 15, a device 4200 for displaying an illumination is similar to the device further includes an input receiver 1550. The input receiver 1550 receives the data required for executing the method of displaying the illumination from the user. For example, the input receiver 1550 receives the illumination information to define the illumination from the user.

Although specific examples of devices 1200, 2200, 3200 and 4200 are described above, a configuration of a device for displaying an illumination is not limited to the described examples. For example, a device for displaying an illumination may include the processor 1210 and the display 1220 illustrated in FIG. 11, and may further include one or more of the memory 1330, the communicator 1440, and the input receiver 1550.

The image display apparatus described herein may be implemented using a liquid crystal display (LCD), a light-emitting diode (LED) display, a plasma display panel (PDP), a screen, a terminal, or any other type of display known to one of ordinary skill in the art. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

The user interface may provide the capability of inputting and outputting information regarding a user and an image. The user interface may include a network module for connecting to a network and a universal serial bus (USB) host module for forming a data transfer channel with a mobile storage medium. In addition, the user interface may include one or more input/output devices, such as a mouse, a keyboard, a touch screen, a monitor, a speaker, a screen, or a software module for controlling the input/output device.

The apparatuses, units, modules, devices, and other components illustrated in FIGS. 12-15 (e.g., the processor 1200, display 1220, memory 1330, communicator 1440 and input receiver 1550) that perform the operations described herein with respect to FIGS. 1-11 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 2 and 4 that perform the operations described herein with respect to FIGS. 3 and 5-15 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of displaying an illumination, the method comprising implementing at least one processor to:
    determine, based on illumination information, an illumination area produced by an illumination source in a virtual space and projected to a layer of the virtual space corresponding to a viewpoint of a scene displayed by a display device, wherein the illumination area is a triangular area including a first vertex corresponding the illumination source, and second and third vertexes defining a base surface;
    determine a boundary area in the illumination area, wherein the boundary area comprises a boundary and outer portions of the illumination area that are less than all of the illumination area and extend adjacent to the boundary from the first vertex to the base surface;
    generate, by overlaying the layer on the scene, an illumination effect produced by the illumination source in the boundary area; and
    control the display device to display the illumination effect.

2. The method of claim 1, wherein the determining of the illumination area comprises:
    determining the illumination area based on at least one of a position, a threshold angle, a direction, an intensity, or a color included in the illumination information.

3. The method of claim 1, wherein the generating of the illumination effect comprises increasing a brightness of a pixel in the boundary area compared to a brightness of a pixel outside the boundary area in the illumination area.

4. The method of claim 1, wherein the generating of the illumination effect comprises determining incremental levels of brightness for pixels in the boundary area, based on respective distances between the pixels and the illumination source, and respective distances between the pixels and the boundary.

5. The method of claim 1, wherein the generating of the illumination effect comprises fitting, to the illumination area, a brightness adjustment map to define incremental levels of brightness for pixels in the boundary area in a predetermined form.

6. The method of claim 1, wherein the generating of the illumination effect comprises extending the boundary area in response to an overlap between the boundary area and another boundary area of another illumination source.

7. The method of claim 1, wherein the generating of the illumination effect comprises:
   in response to an overlap between the boundary area and another boundary area of another illumination source, adjusting a brightness and a color of the boundary area by overlapping a brightness and a color of the another boundary area in an overlapping area of the boundary area and the another boundary area.

8. The method of claim 1, wherein the generating of the illumination effect comprises:
   in response to an overlap between the boundary area and another boundary area of another illumination source, assigning a weight to respective incremented levels of brightness for pixels in an overlapping area of the boundary area and the another boundary area.

9. A non-transitory computer readable medium storing instructions that, when executed by a processor, cause the processor to perform the method of claim 1.

10. A device for displaying an illumination, the device comprising:
    a display; and
    at least one processor configured to
       determine, based on illumination information, an illumination area produced by an illumination source in a virtual space and projected to a layer of the virtual space corresponding to a viewpoint of a scene displayed by the display, wherein the illumination area is a triangular area including a first vertex corresponding the illumination source, and second and third vertexes defining a base surface,
       define a boundary area in the illumination area, wherein the boundary area comprises a boundary and outer portions of the illumination area that are less than all of the illumination area and extend adjacent to the boundary from the first vertex to the base surface,
       generate, by overlaying the layer on the scene, an illumination effect produced by the illumination source in the boundary area, and
       control the display to display the illumination effect.

11. The device of claim 10, wherein the at least one processor is further configured to generate the illumination effect by increasing a brightness of a pixel in the boundary area compared to a brightness of a pixel outside the boundary area in the illumination area.

12. The device of claim 10, wherein the at least one processor is further configured to generate the illumination effect by determining incremental levels of brightness for pixels in the boundary area based on respective distances between the pixels and the illumination source, and respective distances between the pixels and the boundary.

13. The device of claim 10, wherein the at least one processor is further configured to generate the illumination effect by fitting, to the illumination area, a brightness adjustment map to define incremental levels of brightness for pixels in the boundary area in a predetermined form.

14. The device of claim 10, wherein the at least one processor is further configured to generate the illumination effect by extending the boundary area in response to an overlap between the boundary area and another boundary area of another illumination source.

15. The device of claim 10, wherein the at least one processor is further configured to generate the illumination effect by adjusting a brightness and a color of the boundary area by overlapping a brightness and a color of another boundary area of another illumination source in an overlapping area of the boundary and the another boundary area, in response to an overlap between the boundary area and the another boundary area.

16. The device of claim 10, wherein the at least one processor is further configured to generate the illumination effect by assigning a weight to respective incremented levels of brightness for pixels in an overlapping area of the boundary area and another boundary area of another illumination source, in response to an overlap between the boundary area and the another boundary area.

17. A method of displaying an illumination, the method comprising:
    determining, by at least one processor,
       a first illumination area corresponding to light projected by a first light source, wherein the first illumination area is a first triangular area including a first vertex corresponding the first light source, and second and third vertexes defining a first base surface,
       a second illumination area corresponding to light projected by a second light source, wherein the second illumination area is a second triangular area including a fourth vertex corresponding the first light source, and fifth and sixth vertexes defining a second base surface,
       a first boundary area of the first light source, wherein the first boundary area comprises a first boundary and outer portions of the first illumination area that are less than all of the first illumination area and extend adjacent to the first boundary from the first vertex to the first base surface,
       a second boundary area of the second light source, wherein the second boundary area comprises a second boundary and outer portions of the second illumination area that are less than all of the second illumination area and extend adjacent to the second boundary from the fourth vertex to the second base surface, and
       an extended boundary area based on an overlap area in which the first boundary area and the second boundary area overlap, the extended boundary area extending outside the first boundary area and the second boundary area; and
    generating, by the at least one processor, an illumination effect produced by the first and second light sources in the first boundary area, the second boundary area and the extended boundary area; and
    controlling, by the at least one processor, the display device to display the illumination effect.

18. The method of claim 17, wherein the generating of the illumination effect comprises:
    increasing brightness for a pixel in the first boundary area compared to a brightness adjustment for a pixel in a remainder of the first illumination area; and
    increasing brightness for a pixel in the second boundary area compared to a brightness adjustment for a pixel in remainder of the second illumination area.

19. The method of claim 18, wherein the generating of the illumination effect further comprises adding, in the overlap area, a brightness adjustment for a pixel in the first boundary area and a brightness adjustment for a pixel the second boundary area.

20. The method of claim 17, wherein the generating of the illumination effect comprises overlapping, in the overlap area, a color of the first boundary area and a color of the second boundary area.

21. The method of claim 1, wherein the generating of the illumination effect comprises fitting, to the illumination area, a brightness adjustment map having a triangular form and defining incremental levels of brightness for pixels in the boundary area.

\* \* \* \* \*